(12) United States Patent
Martin

(10) Patent No.: US 11,059,335 B2
(45) Date of Patent: *Jul. 13, 2021

(54) TIRE TRACTION DEVICES

(71) Applicant: David Martin, Bend, OR (US)

(72) Inventor: David Martin, Bend, OR (US)

( * ) Notice: Subject to any disclaimer, the term of this patent is extended or adjusted under 35 U.S.C. 154(b) by 348 days.

This patent is subject to a terminal disclaimer.

(21) Appl. No.: 15/989,970

(22) Filed: May 25, 2018

(65) Prior Publication Data

US 2019/0135056 A1     May 9, 2019

Related U.S. Application Data

(63) Continuation-in-part of application No. 14/259,223, filed on Apr. 23, 2014, now Pat. No. 9,981,511.

(51) Int. Cl.
| | | |
|---|---|---|
| *B60C 27/10* | (2006.01) | |
| *B60C 27/06* | (2006.01) | |
| *B60C 27/20* | (2006.01) | |

(52) U.S. Cl.
CPC ............ *B60C 27/10* (2013.01); *B60C 27/062* (2013.01); *B60C 27/067* (2013.01); *B60C 27/20* (2013.01)

(58) Field of Classification Search
CPC ..... B60C 27/10; B60C 27/20; B60C 27/0238; B60C 27/06; B60C 27/067; B60C 27/068; B60C 27/16; B60C 27/18
See application file for complete search history.

(56) References Cited

U.S. PATENT DOCUMENTS

| | | | | |
|---|---|---|---|---|
| 2,582,193 | A * | 1/1952 | Dowdell ................. | B60C 27/10 152/217 |
| 2,931,413 | A * | 4/1960 | Randall ................... | B60C 27/10 152/219 |
| 4,130,155 | A * | 12/1978 | Barnett ................... | B60C 27/10 152/217 |
| 4,240,485 | A * | 12/1980 | Barnett ................... | B60C 27/10 152/219 |
| 4,282,916 | A * | 8/1981 | Carlson ................... | B60C 27/10 152/219 |
| 4,862,935 | A * | 9/1989 | Goto ....................... | B60C 27/10 152/213 A |
| 5,318,087 | A * | 6/1994 | Chang Gun ............ | B60C 27/10 152/219 |
| 5,454,412 | A * | 10/1995 | Bowers ................... | B60C 27/02 152/208 |
| 8,061,397 | B2 * | 11/2011 | Bozkurt ................. | B60C 27/02 152/218 |
| 8,141,605 | B2 * | 3/2012 | Park ....................... | B60C 27/22 152/213 R |

(Continued)

*Primary Examiner* — Jason R Bellinger
(74) *Attorney, Agent, or Firm* — Donn K. Harms

(57) ABSTRACT

A tire traction assembly for mounting upon a tire. The assembly includes a plurality of flexible members such as chains or cables engaged in pivoting connections with brackets at opposing ends. A separable adjustable connector such as a toothed member is attached to a first of the two brackets and configured for engagement with a ratchet mechanism attached to the second of the brackets to releasably secure the tire traction assembly around the tire. A plurality of traction cables configured to traverse the rolling surface of the tire are located in-between the brackets. The brackets may include a planar tread plate which has opposing planar side surfaces configuring the brackets to a U-shape.

16 Claims, 16 Drawing Sheets

(56) References Cited

U.S. PATENT DOCUMENTS 9,981,511 B2 * 5/2018 Martin ................ B60C 27/0238
2006/0225254 A1 * 10/2006 Fu ........................... B60C 27/10
24/68 TT

* cited by examiner

TIRE TRACTION DEVICES

This Application is a Continuation In Part to U.S. patent application Ser. No. 14/259,223 filed on Apr. 23, 2014, which is incorporated herein in its entirety by this reference thereto.

BACKGROUND

Snow, ice, freezing rain, and the like can make road surfaces slippery and dangerous for motorists to successfully navigate. Tire traction devices, such as tire chains or cables, can be mounted to the tires of a vehicle to improve traction and increase safety during these conditions. The process of mounting such traction devices to the tires of a vehicle may be time-consuming, cumbersome, and dangerous. It would be advantageous to provide tire traction devices which address these and other issues.

SUMMARY

A summary of certain embodiments disclosed herein is set forth below. It should be understood that these aspects are presented merely to provide the reader with a brief summary of these certain embodiments and that these aspects are not intended to limit the scope of the present disclosure.

Generally, the present disclosure relates to tire traction devices comprising a tire traction assembly configured to be mounted on a tire and more specifically, the present disclosure relates to tire traction devices comprising a tire traction assembly that is releasably secured around a tire via an attachment assembly comprising a pair of brackets and an attachment mechanism securely attached to the brackets and positioned about the outward facing sidewall of the tire. In accordance with the present disclosure, traction devices may be configured such that a user may mount the traction device to the tire from the outward facing side of a vehicle to which the tire is mounted, generally without having to reach around to the inward facing side of the tire to secure the traction device.

Traction devices in accordance with the present disclosure feature a tire traction assembly configured to be mounted on a tire; a pair of brackets attached to opposite ends of the tire traction assembly, the brackets configured to substantially straddle the sidewalls of the tire; and an attachment mechanism comprising first and second mating elements attached to opposite brackets, the mating elements configured to releasably secure the device to the tire from the outward facing side of a vehicle on which the tire is mounted. In some embodiments, the first mating element comprises a ratchet mechanism and the second mating element comprises a toothed member.

In some embodiments, traction devices in accordance with the present disclosure feature a tire traction assembly having a plurality of elastomeric tensioners positioned about the traction assembly, the elastomeric tensioners each configured to substantially maintain separation between at least two points of the traction assembly by a distance defined by the length of the elastomeric tensioner when in an unloaded position.

In some embodiments, traction devices in accordance with the present disclosure feature a tire traction assembly comprising a pair of flexible members such as a pair of tension cables or chains, configured to align in a substantially concentric orientation about opposite sidewalls of the tire, defining a first radius; a plurality of traction members such as flexible cables or chains, attached at opposite ends to the flexible members such as tension cables, the traction cables configured to traverse the rolling surface of the tire; and one or more secondary flexible members such as support cables, configured to align in a substantially concentric orientation about a second radius at least greater than the first radius, the support cables being securely attached to one or more of the traction cables. In some embodiments, the second radius is approximately equal to the outer radius of the tire to which the traction assembly is to be mounted.

Additionally, the present disclosure provides methods of providing traction to a tire. In some embodiments, a tire traction assembly is positioned around a tire, the tire traction assembly being securely attached at its opposing ends to two brackets, using a connector such as a toothed member which is securely attached to one bracket is engaged with a ratchet mechanism which is securely attached to the other bracket, so that the ratchet mechanism receives the toothed member and thereby releasably secures the tire traction assembly around the tire. The brackets may be positioned such that the ratchet mechanism and toothed member face outwardly from a vehicle on which the tire is mounted, so as to facilitate installation and removal. Other embodiments employ a releasable connector with first and second halves engaged to respective one of the first and second brackets.

The foregoing summary may contain simplifications, generalizations, inclusions, and/or omissions of detail; consequently, those skilled in the art will appreciate that the summary is illustrative only and is not intended to be in any way limiting. In addition to the illustrative aspects, embodiments, and features described above, further aspects, embodiments, and features will become apparent by reference to the drawings, claims, and the following detailed description.

DETAILED DESCRIPTION OF EXEMPLARY EMBODIMENTS

Figure 1:
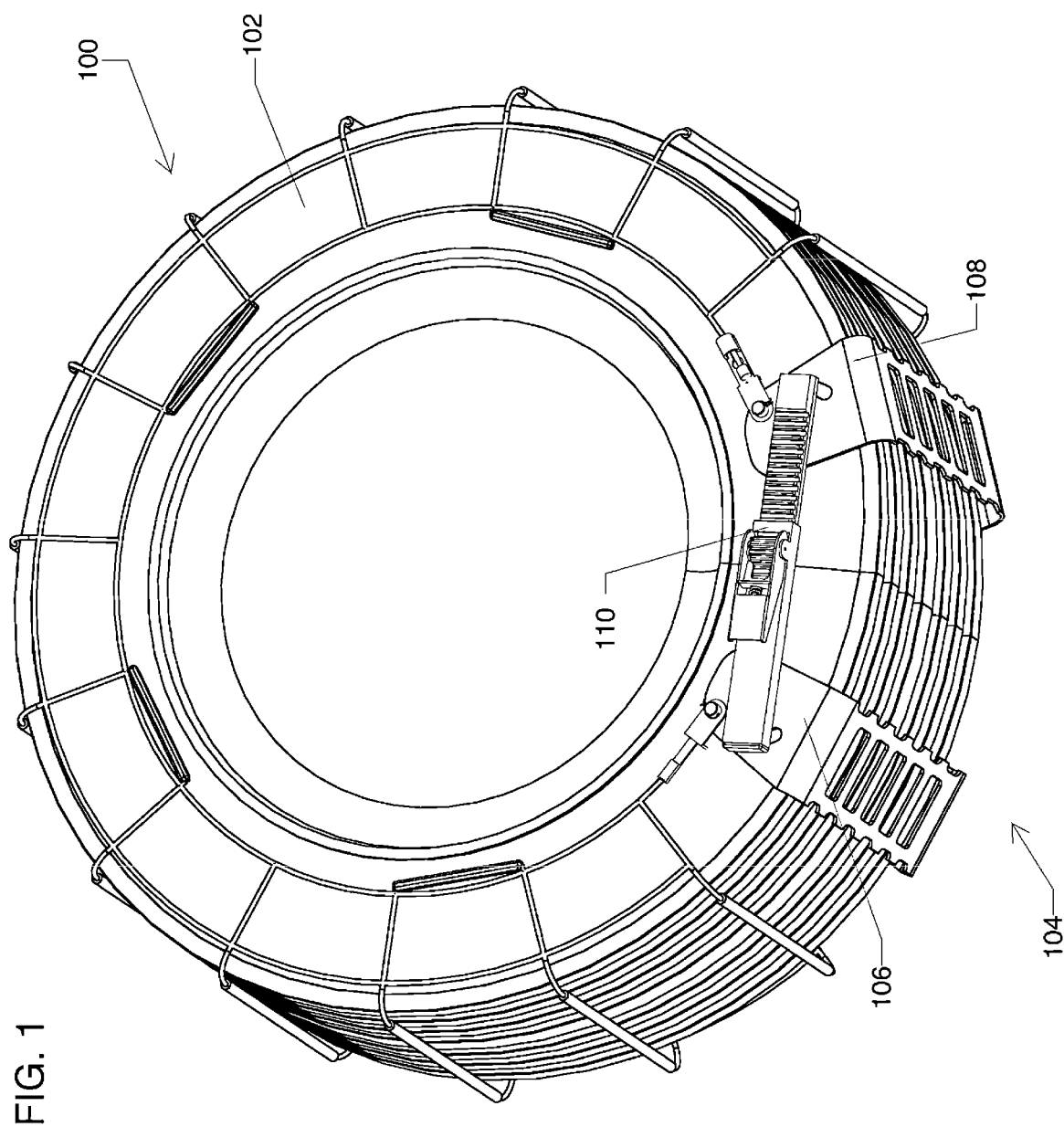
FIG. 1 is a perspective view of one embodiment of a traction device mounted on a tire.

In the following detailed description of exemplary embodiments, reference is made to the accompanying drawings, which form a part hereof. The illustrative embodiments described herein, the drawings, and the claims are not meant to be limiting. Other embodiments may be utilized, and other changes may be made, without departing from the spirit or scope of the present disclosure. The following detailed description of exemplary embodiments is therefore not to be taken in a limiting sense, and it is intended that other embodiments are within the scope of the present disclosure. The claimed subject matter is defined by the appended claims and their equivalents.

The present disclosure relates generally to traction devices to be mounted on tires, and more specifically, the present disclosure relates to tire traction devices that are releasably attached only from the outward facing side of a vehicle on which the tire is mounted. In some embodiments, the traction device may be mounted on a tire without the need to reach around to the inward facing side of the tire to secure the traction device. In some embodiments a tire traction assembly is releasably secured around a tire via an attachment assembly comprising a pair of brackets and an attachment mechanism securely attached to the brackets and positioned about the outward facing sidewall of the tire. The traction devices disclosed herein improve traction and allow for enhanced vehicular navigation over snow, ice, mud, and other slippery driving surfaces or terrain. The traction devices may be applied to any one or more tires. Generally, the traction devices would be applied to at least two tires, but could be applied to more tires, e.g., four tires or more, depending on the vehicle, the road conditions, and the amount of additional traction needed.

Generally, conventional traction devices, such as tire chains or cables (collectively referred to herein as "conventional chains"), can be difficult to properly affix to a tire. For example, with the roll-on method for mounting conventional chains, the chain is draped over the top of the wheel, and then the vehicle gradually drives forward, with the tire rolling upon a certain length of the chain, before opposite ends of the chain are attached together around the circumference of the tire. Alternatively, conventional chains may be laid out on the ground, ensuring for proper alignment with the tires of the vehicle, then gradually driving the vehicle on top of the chains, generally to a middle portion, and then wrapping the chains up over the tire and affixing the ends together. The roll-on method requires multiple stops of the vehicle, and particularly during inclement weather or upon rough or unimproved terrain, users may experience difficulty in properly aligning conventional chains and advancing the vehicle forward to the proper mounting position.

Many users will appreciate the convenience of mounting conventional chains with one-stop of the vehicle, and without the added step of advancing the vehicle forward over a length of the chain. This one-stop mounting, however, tends to result in inadequate mounting of conventional chains, such as an inordinate chain gap across the portion of the tire contracting the ground during mounting, which can result in a section of tire having inadequate traction, misalignment or inadequate chain tension, which can result in conventional chains becoming partially or fully detached from the tire.

With conventional chains, frequently a user must reach to the inward facing side of the tire to secure the chain ends together. This process is time consuming, cumbersome, and frequently dirty. Especially in inclement weather or upon unimproved terrain, mounting conventional chains is usually not an enjoyable task. It can be difficult and uncomfortable for a user to reach around a tire, which may be wet, dirty, and covered with snow and ice, mud, etc. From an ergonomic standpoint, in order to install conventional chains, a user may need to kneel or lay on the ground in order to reach the attachment mechanisms on either side of the tire. In addition, the user is at great personal risk of getting injured by a passing motorist when applying conventional chains to a vehicle. These and other challenges have led to users that are unwilling or unable to properly mount conventional chains.

Other devices have been developed to replace conventional chains yet provide similar benefits of added traction. For example, other devices may consist of a central hub and a plurality of arms with a traction surface that extend outwardly from the hub and wrap around the tire. These devices have their own set of disadvantages. For example, the traction arms must be sufficiently thick to provide durability, which results in a rough driving experience relative to conventional chains which may be constructed with relatively narrow diameter. These and other problems concerning conventional chains and other traction devices represent long-felt yet unmet needs. Therefore, solutions to the aforementioned problems are desirable.

EXEMPLARY EMBODIMENTS

The present disclosure provides for tire traction devices comprising a tire traction assembly that are easy for a user to quickly and securely mount to the tires of a vehicle, and more specifically, the present disclosure provides for tire traction devices comprising a traction assembly that is releasably secured around the tire via an attachment mechanism positioned about the outward facing sidewall of the tire. In some embodiments, a traction device is configured such that a user may mount the traction device to the tire without having to reach around to the inward facing side of the tire to secure the traction device. Traction devices in accordance with the present disclosure may be configured to facilitate one-stop mounting.

Figure 2:
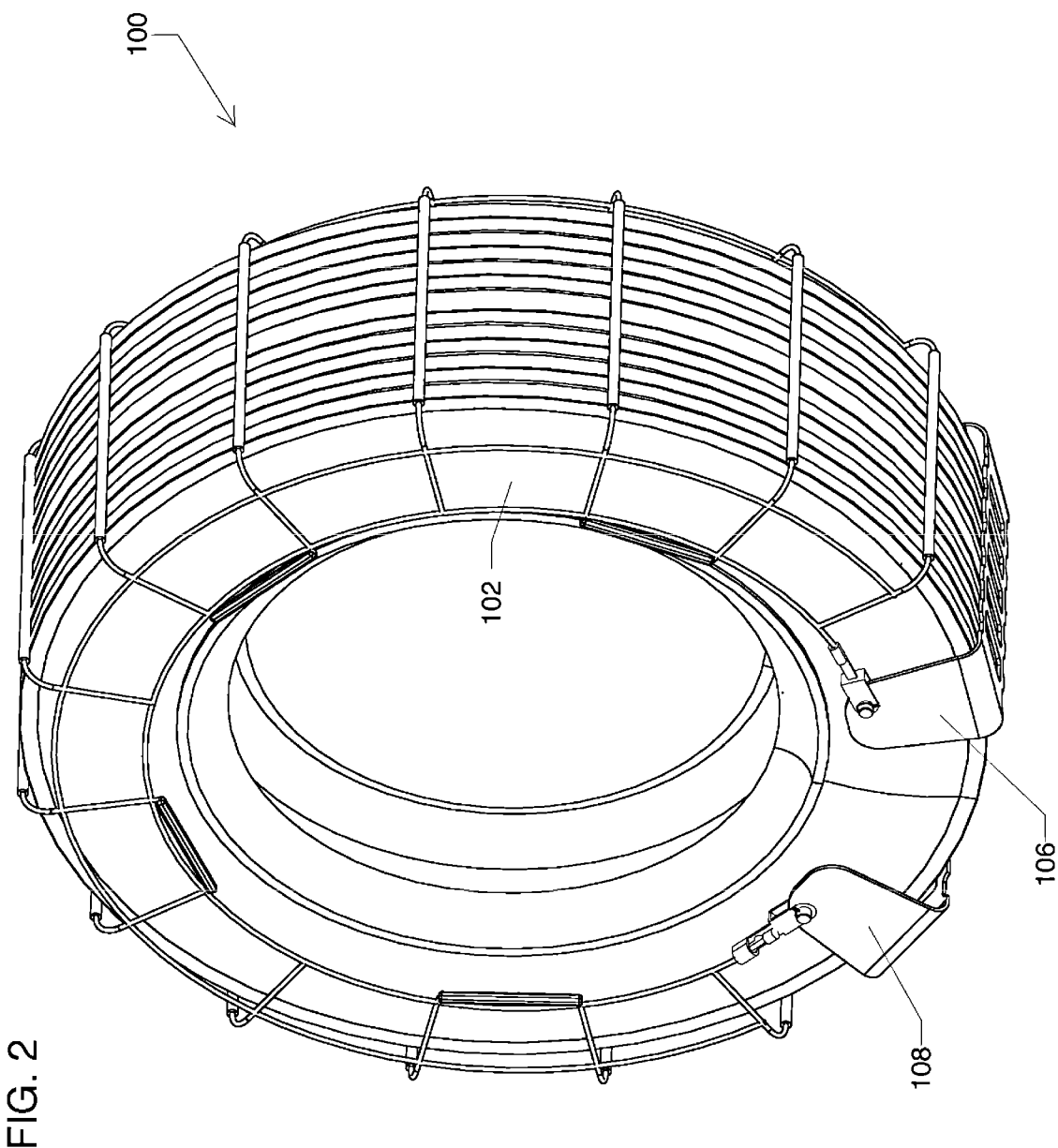
FIG. 2 is a perspective view of the embodiment of a traction device shown in FIG. 1, viewed from the inward facing side.

Referring to FIGS. 1 and 2, one embodiment of a traction device in accordance with the present disclosure is shown, as mounted on a tire. In accordance with the present disclosure, a traction device comprises a traction assembly 100 which wraps substantially around a tire 102 and is releasably secured to the tire via an attachment assembly 104, the attachment assembly comprising a pair of brackets 106, 108, configured to substantially straddle the traction surface and sidewalls of the tire, and an attachment mechanism 110 securely attached to the brackets 106, 108, and configured to releasably secure the traction device to a tire. As shown in the figures, the attachment mechanism 110 is positioned about the outward facing sidewall of the tire. In some embodiments, a traction device may be additionally releasably secured by an attachment mechanism positioned about the inward facing sidewall of the tire; however, as shown, this feature is omitted, such that a user may mount the traction device to a tire using the first half which is engageable with the second half of the attachment mechanism 110 without having to reach around to the inward facing side of the tire.

Figure 3:
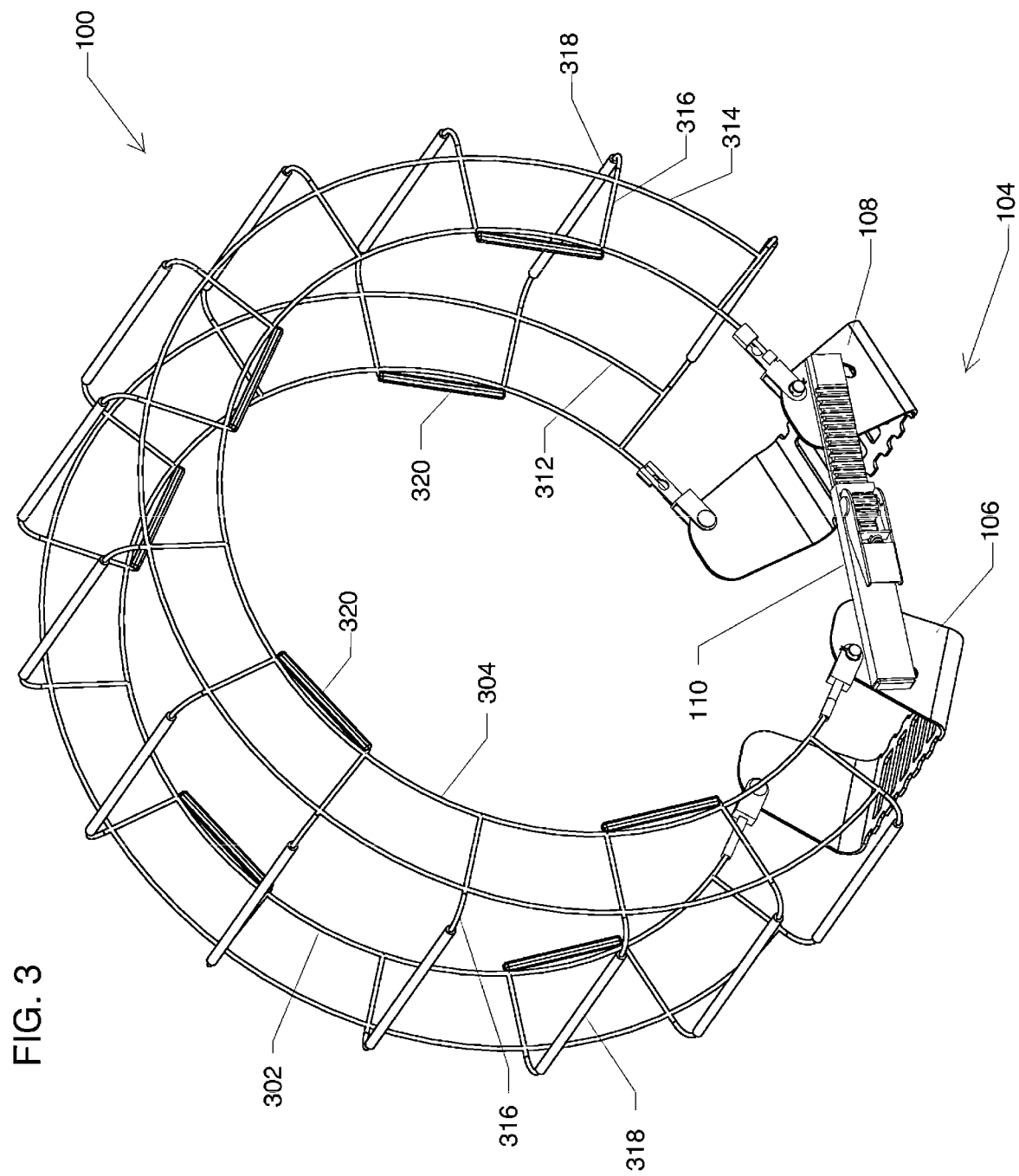
FIG. 3 is a perspective view of the embodiment of a traction device shown in FIGS. 1 and 2, shown as if mounted on a tire, but with the tire omitted for clarity.

Referring to FIG. 3, one embodiment of a traction device is shown, as if mounted on a tire, but with the tire omitted for clarity. The traction assembly 100 may comprise a plurality of cables, chains, combinations of cables and chains, or the like which as noted for convenience are referred to herein as inner attachment cable 302 and outer attachment cable 304. The traction assembly 100 is secured to a tire via an attachment assembly 104 at opposing ends of the attachment cables, comprising a pair of brackets 106, 108, and an attachment mechanism 110. As shown, the attachment mechanism 110 is positioned about the outward facing sidewall of the tire, to facilitate installation and removal. The traction assembly 100 comprises flexible members forming an inner attachment cable 302 and an outer attachment cable 304, each configured to extend in a substantially concentric manner about the respective inner and outer sidewalls of the tire, thus defining a radius, both of which attachment cables are attached at their ends to the attachment assembly 104, for example, at the brackets 106, 108. As noted above, while the term attachment cables is employed for the flexible members herein for convenience and the attachment cables 302 and 304 are shown as cabling in many of the drawings, any flexible member with sufficient strength and which will engage around a tire and to the brackets 106 and 108 at distal ends, such as a chain shown in FIG. 16 can also be employed as it is the U-shaped rigid brackets 106 and 108 which render the engagement of the attachment cables 302 and 304 to hold the traction assembly 100 on a tire without the need to secure them behind the tire.

Optionally, the traction assembly 100 further comprises an inner support cable 312 and an outer support cable 314, provided, for example, to help align the traction assembly about the tire. Support cables 312, 314 may be positioned to extend in a substantially concentric manner, thus defining a radius, for example, a radius at least greater than the radius defined by the tension cables 302, 304. As shown, the radius defined by support cables 312, 314 is approximately equal to the outer radius of the tire to which the traction assembly is to be mounted.

The traction assembly 100 further comprises a plurality of traction members 318 shown as traction cables 316, spaced for example, at substantially uniform intervals, between the brackets 106, 108. The traction members 318 are configured to extend from attachments to the flexible members shown as inner attachment cables 302 and outer attachment cables 304. Such may be direct attachments or may employ the optional inner flexible member shown as inner support cable 312, across the rolling surface of the tire, to the optional outer flexible member shown as a support cable 314 which form the connection to the outer flexible member shown as the outer attachment cable 304, with a substantially perpendicular orientation relative to the attachment cables and the support cables. By substantially is meant running normal or at 90 degrees between the attachment cables 302 and 302 plus or minus ten degrees.

In some embodiments, the traction assembly 100 further comprises the plurality of traction members 318 comprising a plurality of traction elements (not shown) having a textured surface or other traction-imparting features configured to improve tire traction. Traction-imparting features may include any features known in the art. In some embodiments, the traction members 318 may be affixed to a plurality of traction cables 316, such as by threading the traction cables through the traction members or by crimping the traction members to the traction cables, etc. In other embodiments, the traction cables 316 are configured to provide a textured surface or other traction-imparting features sufficient to serve the purpose of the traction members or the traction elements, in which case additional traction members may not be provided, other than the textured surface or traction-imparting features of the traction cables. In yet other embodiments, both the traction members 318 and the traction cables 316 may be configured to provide traction-imparting features. In some embodiments, the configuration of traction cables 316 may differ as between the portion traversing the rolling surface of a tire and the portions traversing the sidewalls of a tire; for example, traction imparting features may be provided only across a subsection of traction cables 316, e.g., across the subsection which substantially comprises the portion intended to traverse the rolling surface of the tire. As used herein, references to the traction members 318 also means and includes the plurality of traction elements and/or the traction cables 316, either together or in the alternative.

In some embodiments, the relative position of the traction cables 316 are, in part, maintained by a plurality of optional tensioners 320. The tensioners may comprise elastomeric tensioners, made from elastomeric material, although various alternative forms of tensioners may be used, for example, those which are capable of returning to their substantially original shape when a tension force is removed. In some embodiments, a plurality of tensioners 320 are attached at their ends to segments of tension cables 302, 304. In some embodiments, flexible members providing the attachment cables 302, 304 are threaded through the plurality of tensioners 320.

Figure 11:
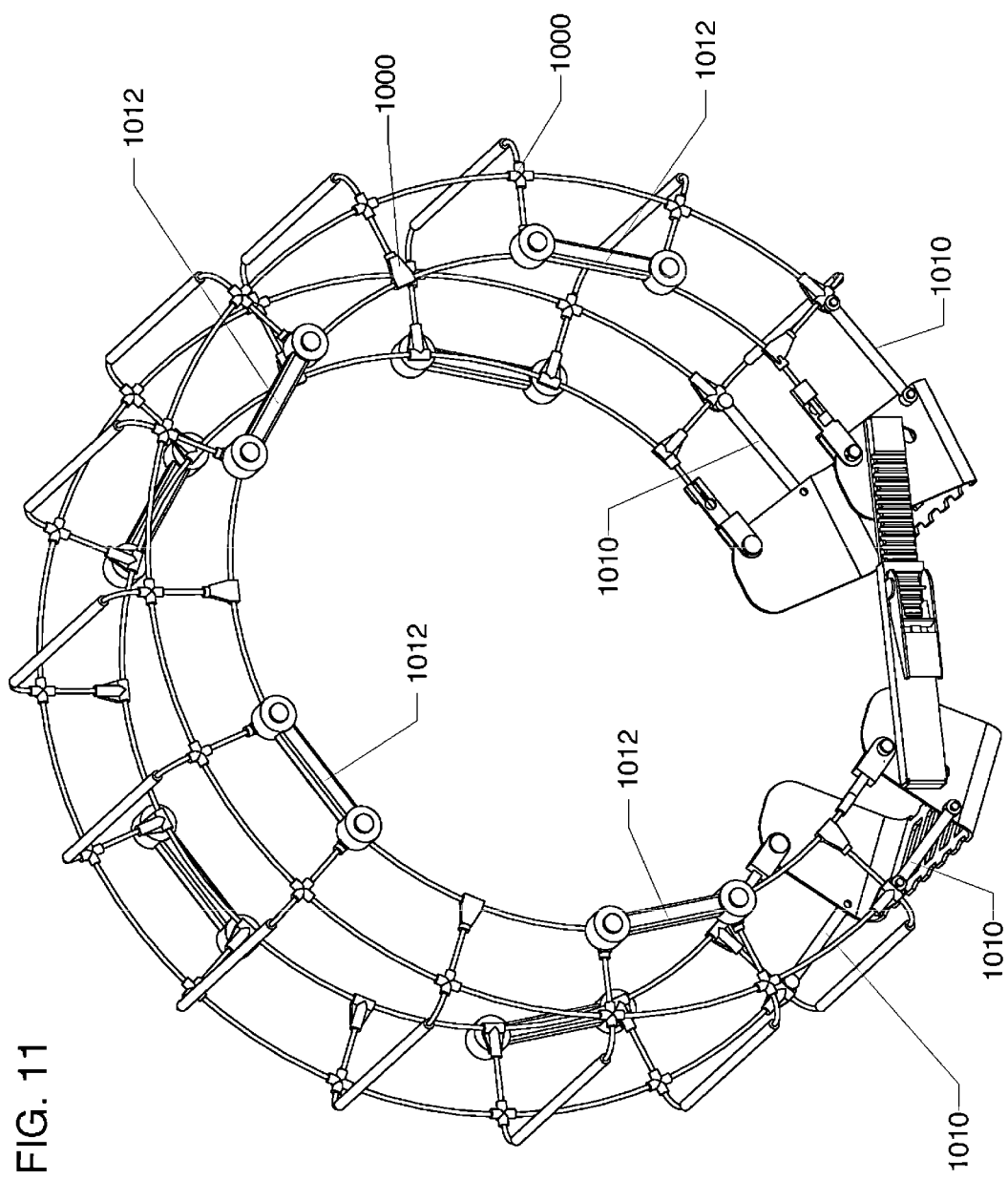
FIG. 11 is a perspective view of the embodiment of a traction device shown in 10 FIG. 10, shown as if mounted on a tire, but with the tire omitted for clarity.

In some embodiments, the relative position of the traction cables 316 are, in part, further maintained by optional support cables, 312, 314, which may be connected to the traction cables by cable crimps, for example as shown in FIG. 11. As shown, the traction cables 316 are spaced at substantially uniform intervals between the brackets 106, 108.

The plurality of cables making up the traction assembly 100 may be constructed of stainless steel alloy cable or other suitable materials. The traction elements may be constructed of hardened steel alloy or other suitable materials. Other elements may be constructed of stainless steel alloy or hardened steel, or other suitable materials.

Figure 4:
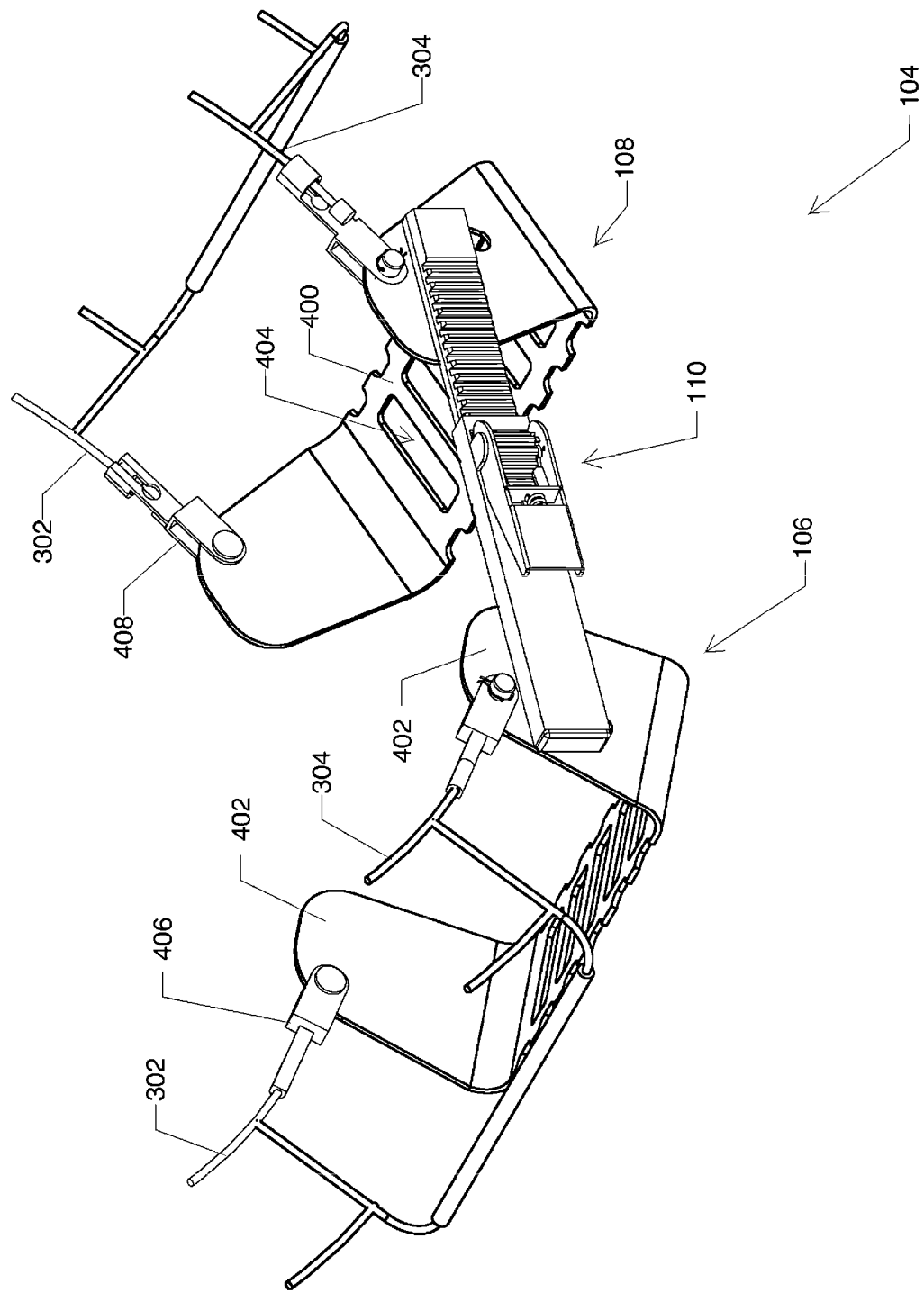
FIG. 4 is a perspective view of one portion of a traction device embodiment showing an attachment assembly.

Referring to FIG. 4, one embodiment of an attachment assembly 104 is shown. The attachment assembly 104 comprises brackets 106, 108, which are substantially rigid and are generally U-shaped. The brackets 106, 108 each comprise a tread plate 400 configured to contact the ground/road on one side and the rolling surface of a tire on the other side, and side surfaces 402, configured such that the brackets 106, 108 wrap across the rolling surface and at least partially around opposite sidewalls of a tire 102, thereby substantially straddling the sidewalls of the tire.

The dimensions of the brackets 106, 108 may be configured to receive one or more tire sizes. For example, the inner width between a pair of facing side surfaces 402 may be dimensioned slightly wider than the width of the tire, so as to enable the brackets 106, 108 to securely straddle the sidewalls of the tire, yet also allow the tire to flex or deform, e.g., while bearing the weight of the vehicle, without exerting undue force on the side surfaces 402. Typically, the inner width between a pair of facing side surfaces 402 will be between about ⅛ of one inch to about 1 inch wider than the width of a tire suitable for mounting.

Brackets 106, 108 may be constructed from a hardened steel alloy or other suitable material that has sufficient strength to resist forces and sufficient hardness to resist friction or wearing from the driving surface. Brackets may be manufactured via a formed/stamped metal process or other manufacturing processes known in the art.

Flexible members such as attachment cables 302, 304 are attached to brackets 106, 108, respectively preferably in a pivotal engagement such as with linkage 406, 408 such as a clevis and pin linkage or with a cable connector engaged with an aperture in the brackets 106 and 108, discussed in more detail below. When employed for a pivoting connection of flexible members such as inner and outer attachment cables 302 and 304, the linkage 406, 408 is secured generally about each end of flexible members shown as attachment cables on one end, and to the side surface 402 of the respective brackets on the other end. Pivoting engagements from linkages 406, 408 may be configured in a multitude of fashions, such as e.g., with a clevis configured to attach to the linkage to bracket 106 or 108, and/or connector engageable with a slot or keyhole or aperture in the brackets 106 and 108, configured to receive attachment cable 302, 304, as discussed in more detail below.

Respective ends of both engageable connectors forming a first half and second half of the attachment mechanism 110, are attached in engagements to opposite brackets 106, 108. In some embodiments, the attachment mechanism 110 is positioned about the outward facing sidewall of the tire 102, and configured such that a user may mount the traction device to the tire without having to reach around to the inward facing side of the tire.

Figure 5:
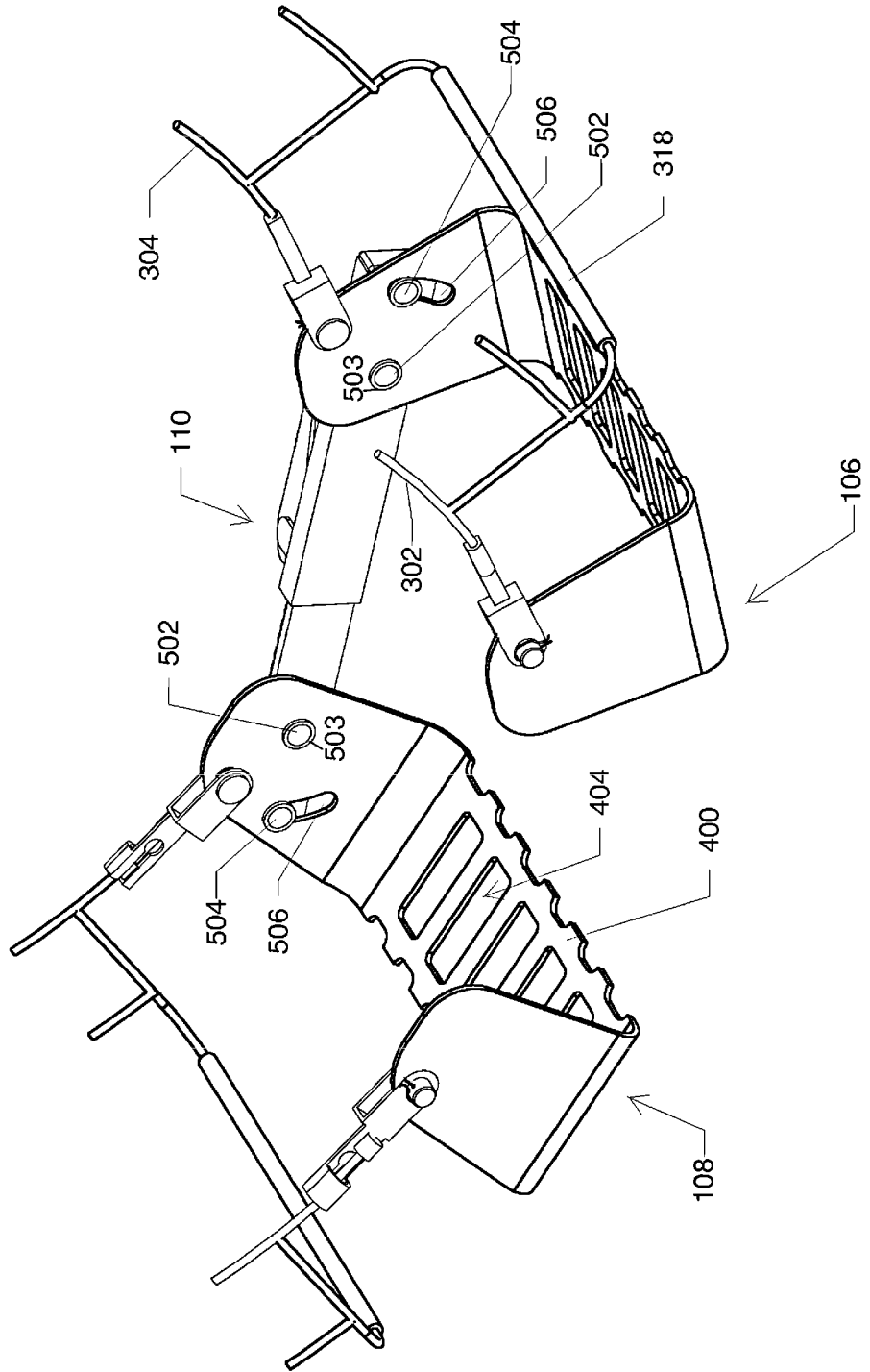
FIG. 5 is a perspective view of the embodiment of an attachment assembly portion of the traction device shown in FIG. 4, viewed from the inward facing side.
Figure 15:
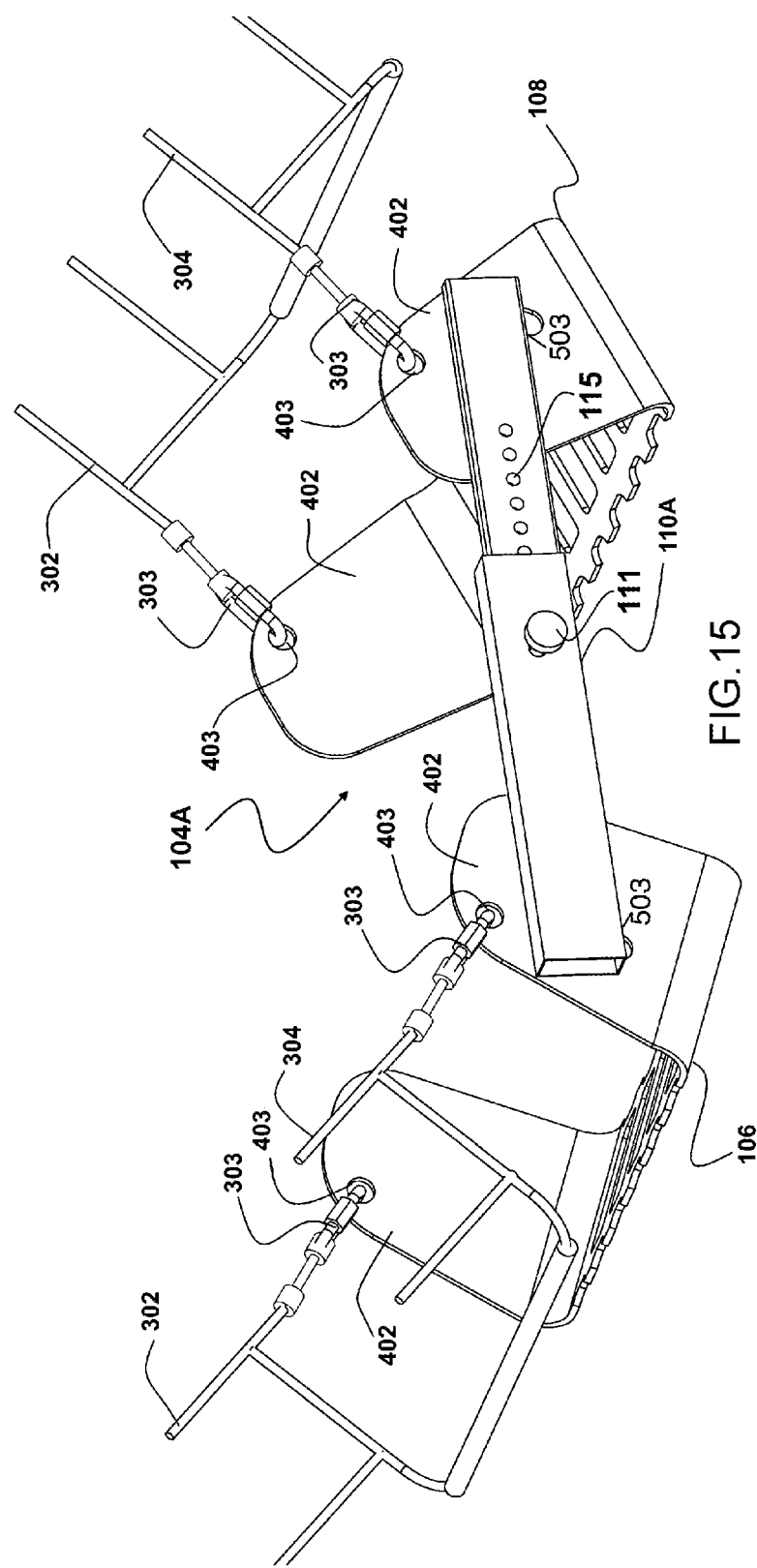
FIG. 15 is a perspective view of one portion of the traction device embodiment showing another configuration of an attachment assembly wherein the inner and outer attachment cables are rotationally engaged to the brackets with a pivoting connector with apertures in the brackets.
Figure 16:
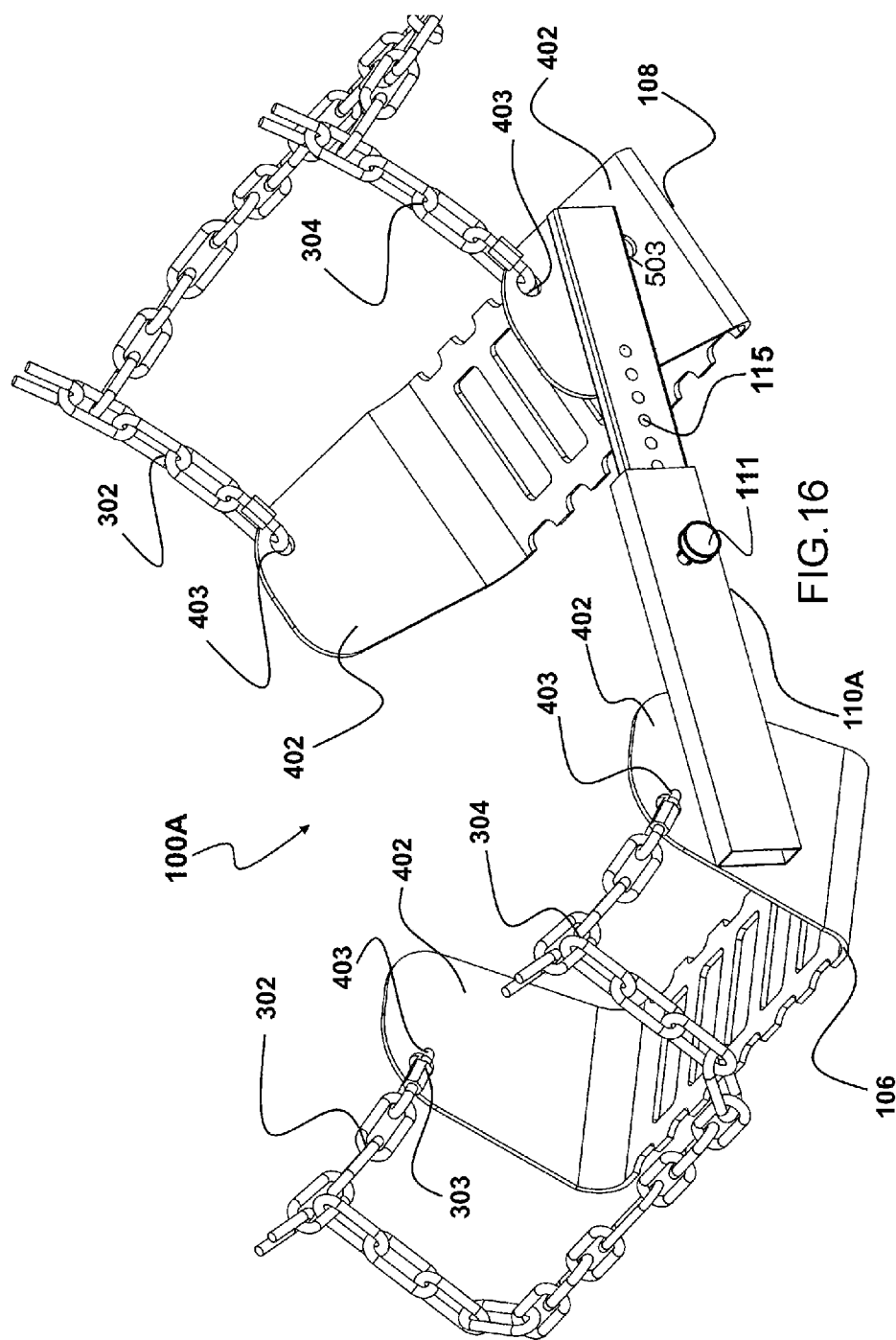
FIG. 16 is a perspective view of one portion of the traction device embodiment showing another configuration of an attachment assembly wherein the flexible members are shown as chains in pivoting connections with apertures in the brackets.

When installed on a tire, the attachment mechanism 104 in FIGS. 4 and 15-16, provides a releasable secure connection with substantial rigidity to withstand forces during operation, e.g., lateral, radial, rotational, and torsional forces. In some embodiments, one or both of the first half and second half of the attachment mechanism 110 are pivotably attached to brackets 106 and/or 108, respectively, to accommodate a range of tire circumferences and/or to help align the respective portions of the attachment mechanism during installation, while maintaining substantial rigidity. This pivotable attachment can be accomplished, for example, as shown in FIG. 5, by attaching the first half and second half of the attachment mechanism desired to be pivotable to the bracket(s) in pivoting engagements 503 at two pivoting connection points, 502 and 504, the first connection point 502 defining an axis about which the first half of the attachment mechanism portion may pivot relative to the respective bracket, and the second connection point 504 having a crescent-shaped slot 506 which defines the pivotable range of the attachment mechanism relative to the respective bracket. Of course the pivoting engagement 503 can be on a single point on each of the first half of the attachment mechanism 110 and the second half of the attachment mechanism 110 and on the respective side surfaces 402 of the respective bracket 106 or 108 to which a respective half of the attachment mechanism 110 engages, rather than at two points. A similar pivoting engagement 503 is described below and shown in FIGS. 15-16, however, any pivoting attachment of the first half of the attachment mechanism 110 to one of the brackets and second half of the attachment mechanism 110 to the other of the two brackets 106 and 108, as would occur to those skilled in the art are considered within the scope of this invention. For example, having the two halves engaged on at one point using a post engaged with a respective opening in each bracket 106 and 108, or having a bearing mounted on the side surface 402 of each bracket 106 and 108, and connecting each of the first half of the attachment mechanism 110 and second half of the attachment mechanism 110 to one of the respective bearings.

Referring to FIGS. 4 and 5, in some embodiments, the surface of tread plate 400 comprises perforations or holes 404, configured to reduce the rotational mass of the brackets 106, 108, and/or to provide an improved traction surface to the tread plate. For example, the improved traction surface may include protrusions (not shown), such as ribs surrounding the perimeter of the perforations or holes 404, or any desired surface texture.

The each of a first half and second half of an attachment mechanism 110 may be attached to the brackets 106, 108 at respective attachment points via pins, bolts, rivets, or the like, and may include bushings or the like to facilitate a smooth pivoting motion. The first half and second half of the attachment mechanism are slidably adjustable to a fixable engagement with each other to thereby allow for adjustment of the positioning of the brackets 106 and 108 and tightening of the flexible members such as the inner attachment cable 302 and outer attachment cable 304. In some embodiments, substantially flat or low profile, smooth heads are used, such as the bolts 700 shown in FIG. 7. This configuration is advantageous because it minimizes wear on the tire sidewall during use of the traction device. One or both removably engageable fastener halves forming the attachment mechanism 110 may be bolted with a two-bolt arrangement that allows pivoting of such half portion(s) relative to the bracket (s) 106, 108 to which such portion(s) is attached. Alternatively, one or both removably engageable fastening components or portions of the attachment mechanism 110 may be welded to the respective brackets 106, 108 to increase rigidity. When pivotably attached, the pivotable halves which removably engaged and form the attachment mechanism 110 are permitted to pivot about the first connection point 502 to the 30 extent allowed by the crescent shaped slot 506 (as shown in FIG. 5). As can be understood from the drawings, in all modes of the attachment mechanism 110 can be provided by any such mechanism which has a first half removably engageable with a second half and which preferably will adjust in engagement to adjust for the varying positioning of the two brackets 106 and 108 on varying sized tires.

Figure 6:
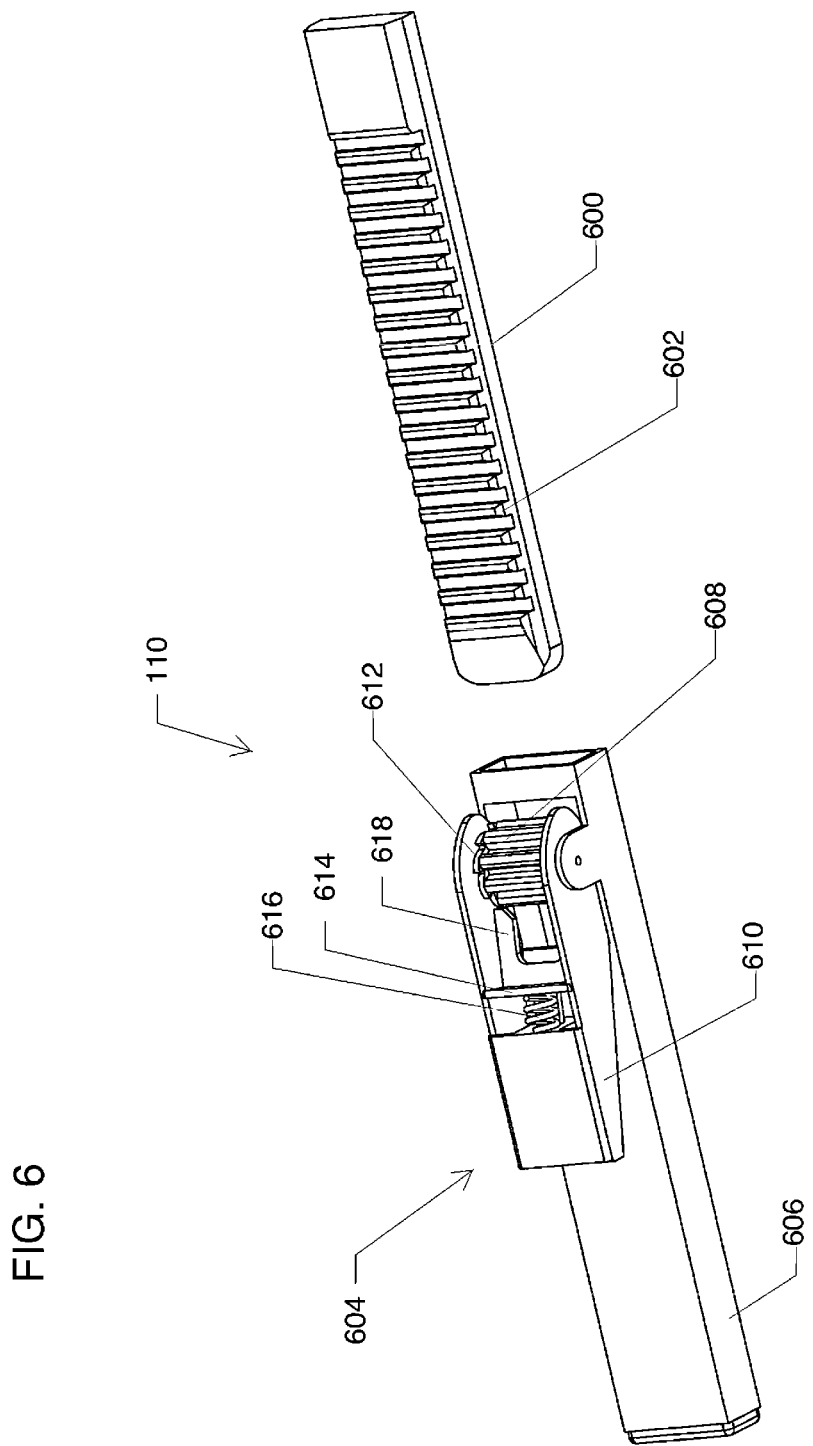
FIG. 6 is a perspective view of one embodiment of an attachment mechanism portion of a traction device.
Figure 7:
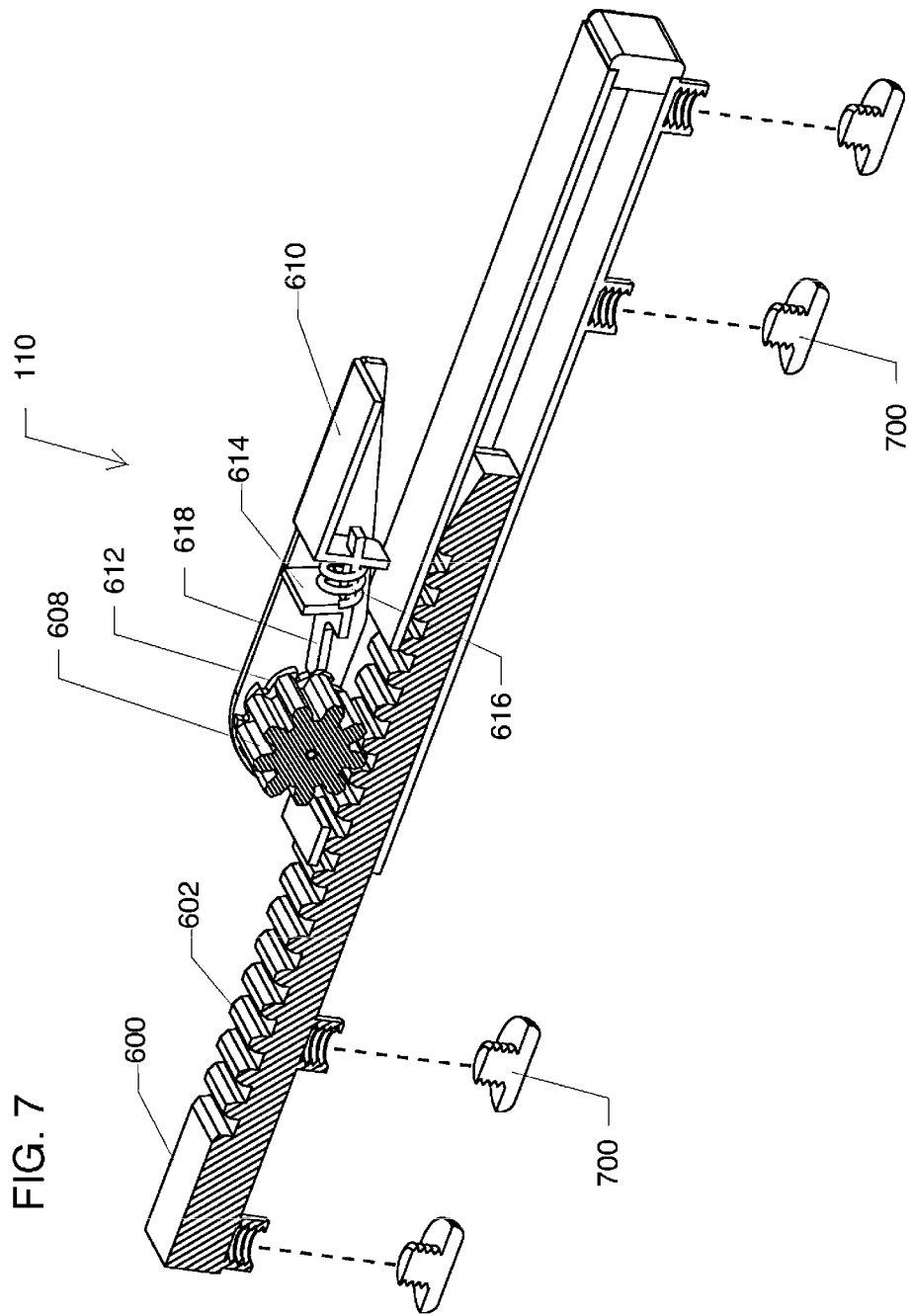
FIG. 7 is a perspective cross-sectional view of one embodiment of an attachment mechanism, with a toothed member partially inserted into a ratchet mechanism.

Referring to FIGS. 6 and 7, one embodiment of an attachment mechanism 110 is shown. In accordance with the present disclosure, attachment mechanism may comprise any mating elements configured to releasably secure the traction device to a tire and as shown, secure the brackets 106 and 108 in a fixed spacing from each other, when positioned around a tire. In some embodiments, the attachment mechanism 110 comprises a ratchet device. In the mode in FIGS. 15-16 the attachment mechanism 118 is shown with a spring loaded pin engageable with a plurality of sequentially spaced openings. As can be discerned, a number of ratchet devices are known in the art. Suitable ratchet devices in accordance with the present disclose are those having sufficient rigidity and strength to withstand forces during operation, for example, lateral, radial, and torsional forces. The ratchet device may be constructed in such a manner and of such a material so as to minimize unwanted flex or movement in or between the various components comprising the ratchet device.

As shown in FIGS. 6 and 7, one embodiment of an attachment mechanism 110 comprises opposite portions, of which one portion, which is a first portion of the attachment mechanism 110 comprises an elongated toothed member 600 having a plurality of teeth 602 and the mating or other portion of the attachment mechanism 110, comprises a ratchet mechanism 604 configured to slidably receive the toothed member 600 and thereby to releasably secure the tire traction assembly to a tire, as shown for example in FIG. 1. The toothed member 600 is securely attached, either fixedly or pivotably, to one bracket (e.g., 108), and the ratchet mechanism 604 is securely attached, either fixedly or pivotably, to the other bracket (e.g., 106). In some embodiments, the ratchet mechanism 604 comprises a sleeve 606 configured to receive at least a portion of the toothed member 600, a pawl mechanism 608 configured to advance the toothed member into the sleeve 606, a ratcheting lever 610 configured to rotate the pawl mechanism 608 via a ratchet wheel 612, and a releasable, spring-loaded locking lever 614 configured to utilize the bias of a spring 616 to releasably secure the pawl mechanism 608 in its position via a pin 618 engaged with the ratchet wheel 612, or, to release the pawl mechanism 608 upon actuation by a user applying pressure against the bias of the spring 616, thereby disengaging the pin 618 from the ratchet wheel.

The toothed member 600 and the sleeve 606 are substantially rigid, and may be, for example, formed entirely of metal, or of a plastic toothed strap bonded to a metal substrate, or other suitable materials. After passing through pawl mechanism 608, the toothed member 600 is received by the sleeve 606, which substantially prevents the toothed member from pivoting relative to the sleeve, even though in some embodiments the toothed member and/or the sleeve may be pivotably attached to the respective brackets 106, 108. Sleeve 606 also helps stabilize toothed member 600, e.g., from lateral, radial, rotational, and torsional forces, thereby minimizing unwanted flex or movement between the ratchet mechanism 604 and the toothed member 600, and between the attachment mechanism 110 and brackets 106, 108.

Ratchet mechanism 604 comprises a ratcheting lever 610 that when actuated upon by a user turns the pawl mechanism 608 via toothed ratchet wheel 612. When a user inserts toothed member 600 into sleeve 606, the pawl mechanism engages teeth 602. The toothed member 600 may be advanced successively further into the ratchet mechanism 604 by the user repeatedly actuating ratcheting lever 610, thereby causing the pawl mechanism 608 to pull toothed member 600 into sleeve 606, and thus drawing brackets 106, 108 towards one another. This process thereby reduces the effective radius of the attachment cables 302, 304, and thus as the radius is so reduced, the entire traction assembly 100 is secured around the perimeter of the tire.

Locking lever 614 is spring biased to positively engage the ratchet wheel 612 via pin 618. To release the toothed member 600 from the ratchet mechanism 604, such as to remove the traction device from a tire upon which is has been previously mounted, a user simply actuates the locking lever 614, thereby releasing the pawl mechanism 608 from teeth 602, which, in turn, allows the toothed member 600, to slide through the sleeve 606 and out of the ratchet mechanism.

Figure 8:
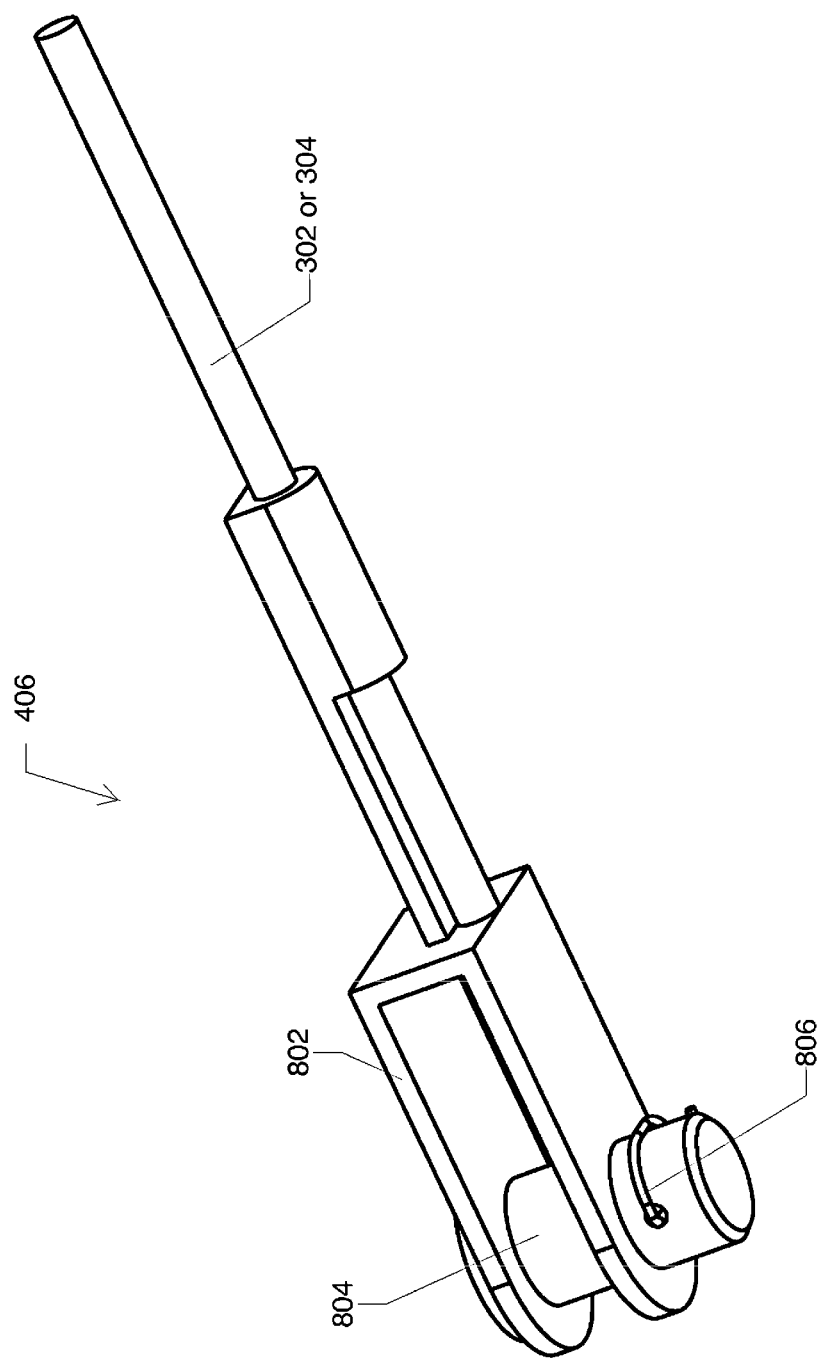
FIG. 8 is a perspective view of one embodiment of the linkage used in certain embodiments of a traction device to fasten a traction assembly to an attachment assembly.
Figure 9:
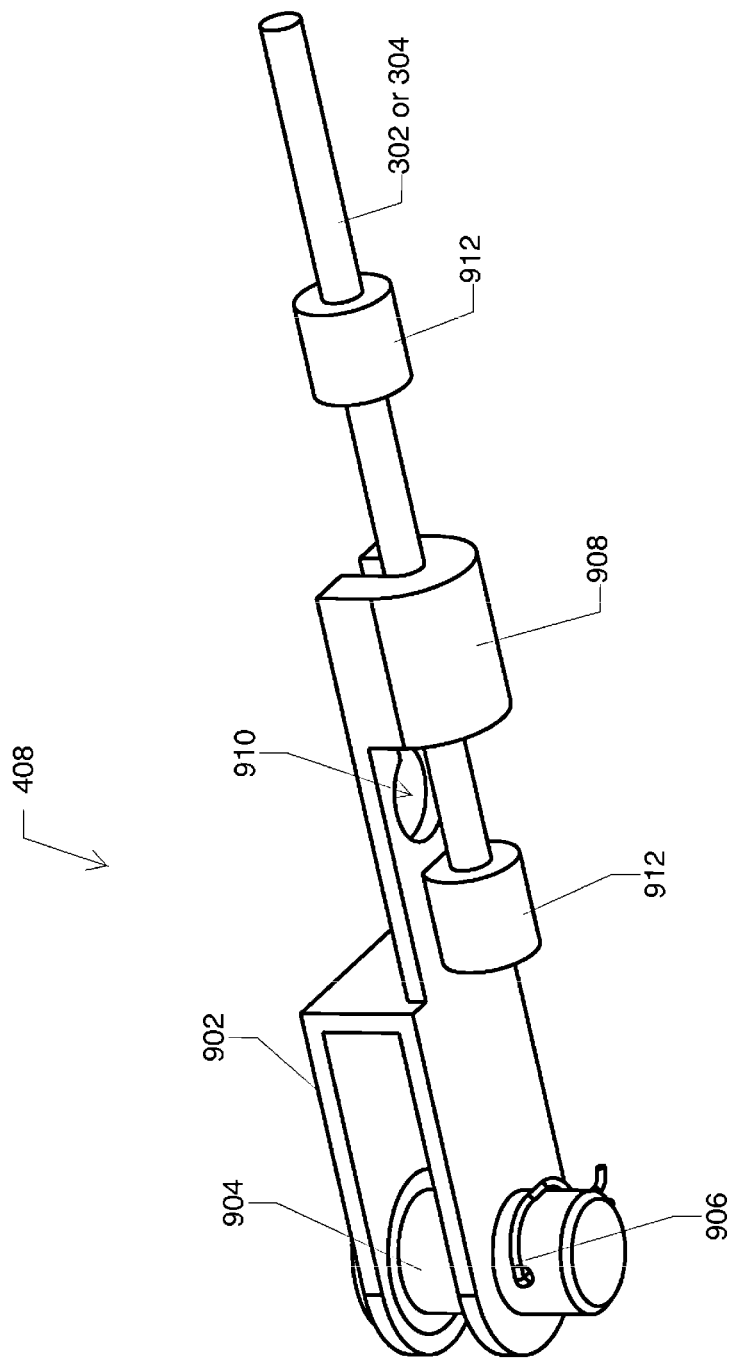
FIG. 9 is a perspective view of an alternative embodiment of the linkage used in certain embodiments of a traction device to fasten a traction assembly to an attachment assembly.

Referring to FIGS. 8 and 9, alternative embodiments of a linkage 406 and 408, respectively, are shown for attaching the attachment cables 302, 304 to the brackets 106, 108. In some embodiments, linkage 406 (shown in FIG. 8) is used on one side of each attachment cable, and linkage 408 (shown in FIG. 9) is used on the opposite side of each attachment cable.

Referring to FIG. 8, one embodiment of a linkage 406 which forms a pivoting or rotating engagement of the attachment cable 302 or 304 to the brackets 106 and 108, comprises a clevis 802 and a pin 804 which is inserted through holes in the clevis and a corresponding hole in the respective bracket 106 or 108, thereby securely attaching the linkage to the respective bracket. Pin 804 is secured by a cotter pin 806, or the like. Attachment cable 302 or 304 may be securely fastened to the end of the linkage 406 by crimping the end of the linkage around the attachment cable, or by the use of set-screws, welding, or the like. However, other rotational or pivoting engagements may be employed such as shown in FIGS. 15-16 where a fastener engages rotationally in an aperture on the brackets 106 and 108 or a link should the cables be configured as chains.

Referring to FIG. 9, one embodiment for forming a pivoting connection, a linkage 408 comprises a clevis 902 and a pin 904 which is inserted through holes in the clevis and a corresponding hole in the respective bracket 106, 108, thereby securely attaching the linkage to the respective bracket. Pin 904 is secured by a cotter pin 906, or the like. Flexible members shown as attachment cable 302 or 304 may be securely fastened to the end of the linkage 408 by co operable fastener elements comprising a receiving slot 908 accessible via keyhole 910, configured to receive one of a plurality of lugs 912 fastened to the end ward portion of attachment cable 302 and/or 304. The plurality of lugs 912 are spaced at various intervals, such that by inserting the appropriate lug into keyhole 910 and seating such lug into receiving slot 908, a user may adjust the effective circumference of the attachment cables 302 and/or 304, thereby configuring the traction assembly so as to fit a range of tires having a circumference corresponding to the compatible circumference of the attachment cables. Thus, the effective length of the attachment cable is determined by the number of lugs inserted through the keyhole 910 and the particular lug seated in the receiving slot 908.

Figure 10:
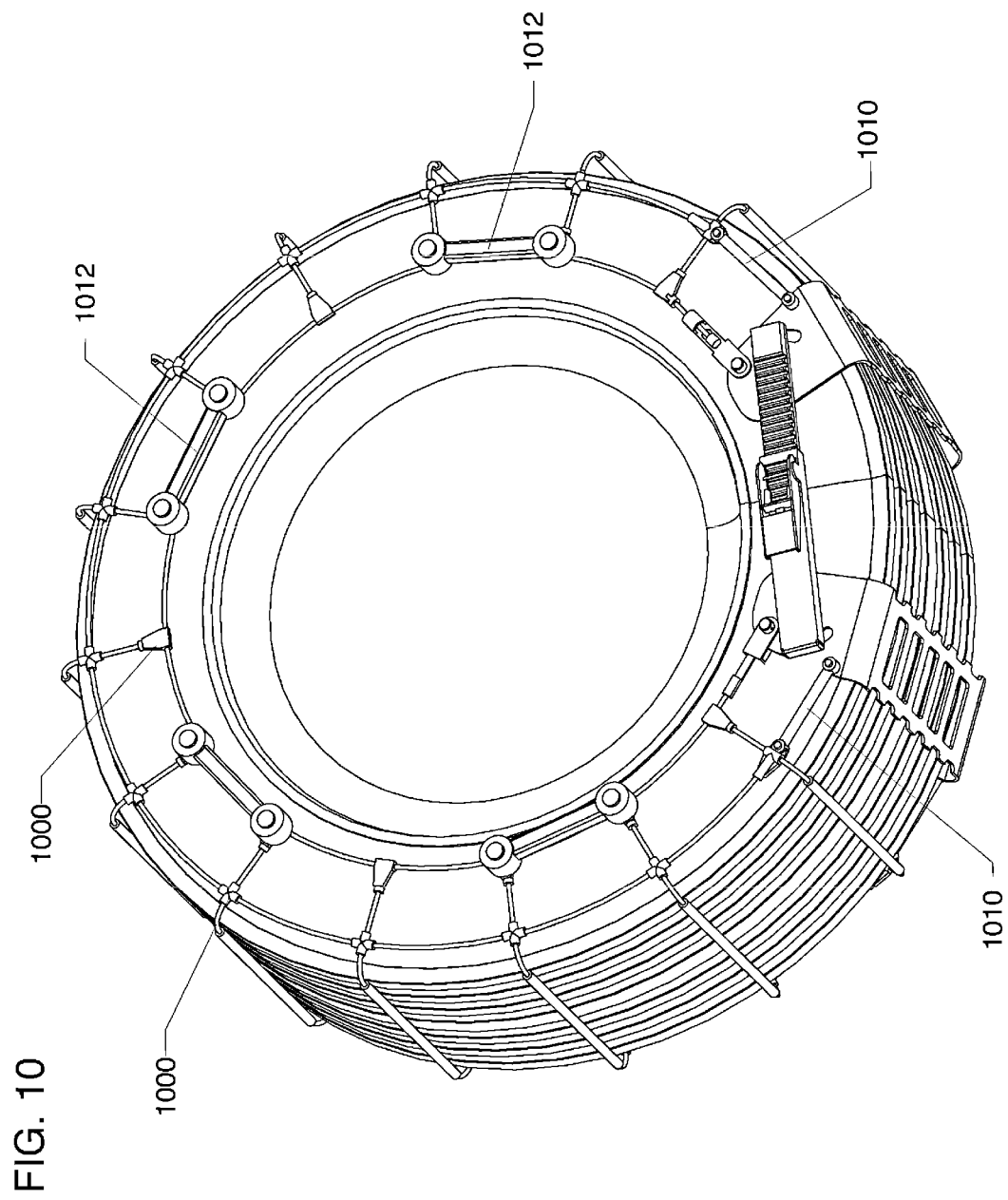
FIG. 10 is a perspective view of an alternate embodiment of a traction device mounted on a tire.
Figure 12:
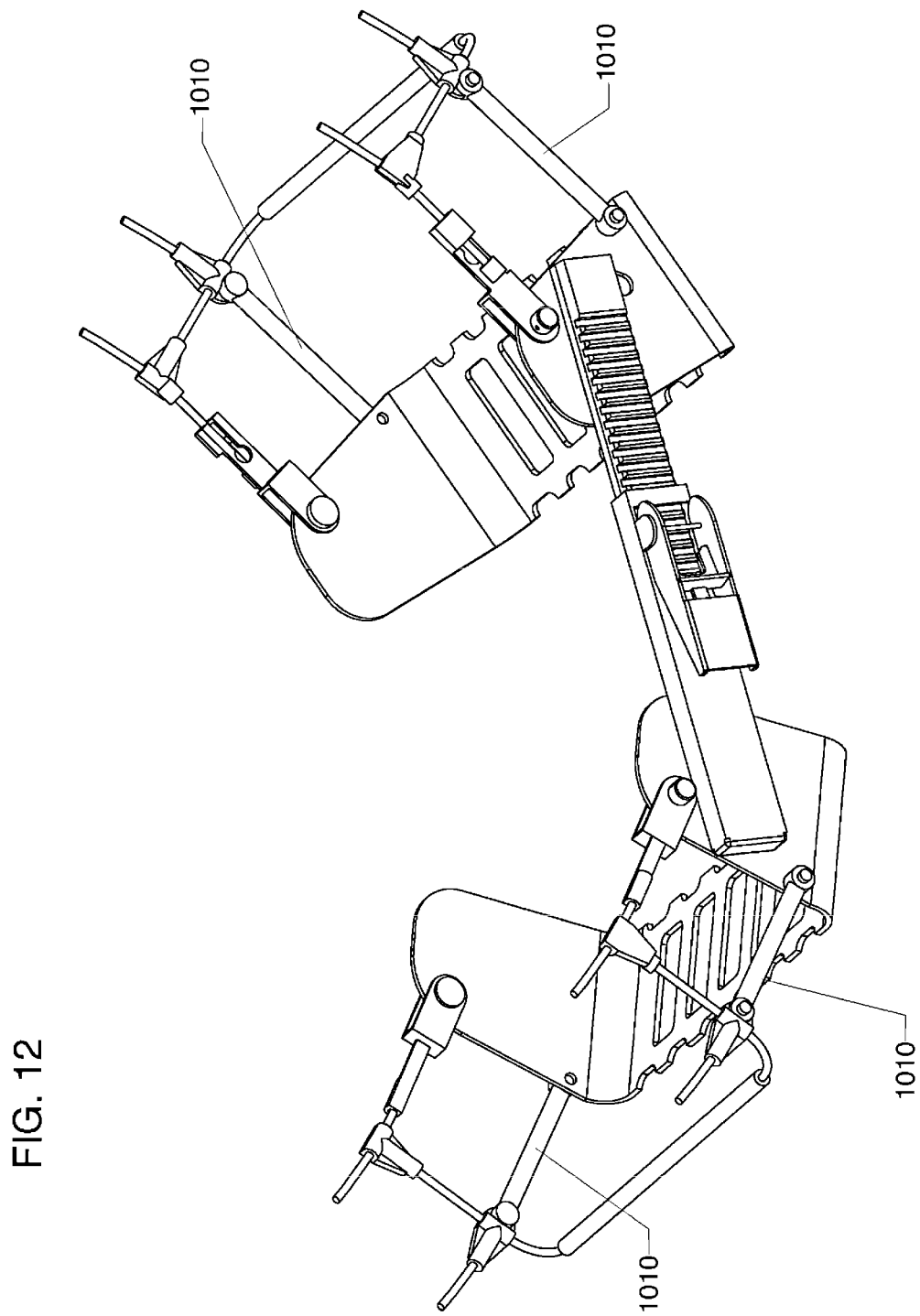
FIG. 12 is a perspective view of an alternate embodiment of an attachment assembly portion of a traction device.
Figure 14:
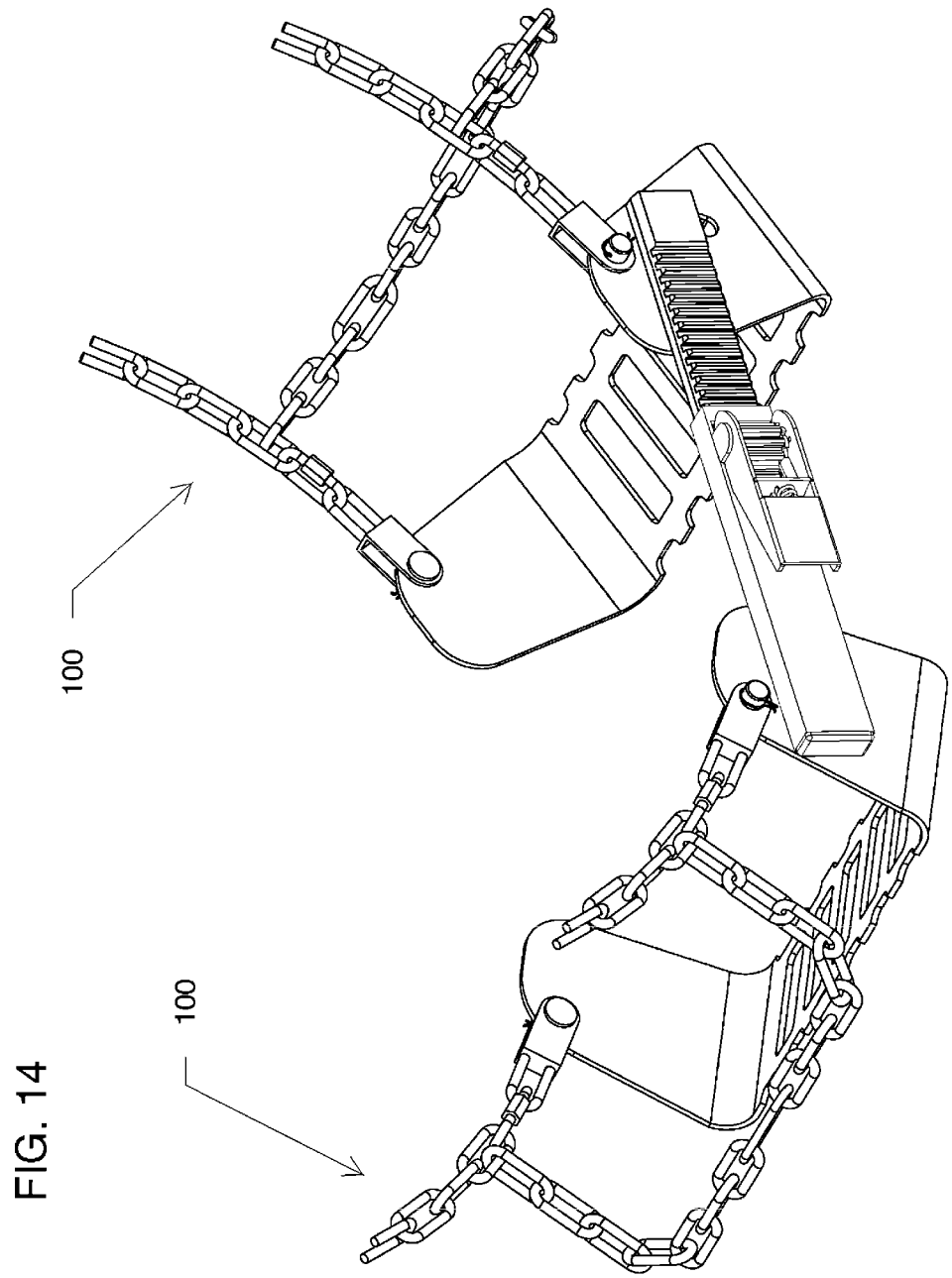
FIG. 14 is a perspective view of the attachment assembly portion of a traction device according to another embodiment.

Referring to FIGS. 10-12, an additional embodiment of a traction device is shown, depicting certain additional optional features in accordance with the present disclosure. In some embodiments, ferrules 1000 are utilized to secure intersections between the various cables of the traction assembly. Ferrules 1000 may be positioned at some or all of the intersections where various cables of the traction assembly intersect. As shown, ferrules 1000 secure intersections between traction cables 316 and attachment cables 302, 304, and between traction cables 316 and support cables 312, 314. Ferrules 1000 may be constructed of aluminum or other materials suitable for being pressed or crimped around cables. Alternatively, in some embodiments, ferrules 1000 may be omitted, for example where the artisan desires certain intersecting cables to float freely; or in further alternative embodiments ferrules 1000 may be omitted when the artisan desires an alternative means for securing intersecting cables, or where aspects of the traction assembly comprise a single, interwoven cable, or where the flexible members of the traction assembly are constructed from links of chain (as shown in FIG. 14 and FIG. 16).

Further referring to additional optional features depicted in FIGS. 10-12, in some embodiments, elastomeric tensioners may be positioned at various locations about a traction device. Such elastomeric tensioners may be configured to enhance the alignment of the traction assembly, for example, the relative position of the traction members 318 about the rolling surface of a tire; to absorb slack or dampen movements in the traction assembly or between the traction assembly and the attachment assembly, for example, slack or movement introduced during operation; and/or to aid in the installation of a traction device, for example, by substantially maintaining separation—provided by the free length of the tensioner when in the unloaded position—between various aspects of the traction assembly so as to facilitate positioning of the traction assembly about the surface of a tire during installation (e.g., to help facilitate one-stop mounting) and/or to reduce tangling among traction assembly aspects during storage, transportation, or installation. Elastomeric tensioners may be constructed from any elastic and/or resilient material known in the art that has sufficient pliability and strength to withstand forces exerted upon the traction device while in use, such as rubber, polymer materials, composites, and the like.

In some embodiments, a plurality of bracket tensioners 1010 (FIGS. 10-12) and/or traction assembly tensioners 1012 (FIGS. 10, 11) may be provided. Bracket tensioners 1010 may be positioned, for example, between brackets 106, 108 and the respective adjacent support cables 312, 314. Traction assembly tensioners 1012 may be positioned, for example, at substantially uniform spaced intervals about the traction assembly, on both the outward and/or inward facing aspects of the traction assembly. As shown in FIGS. 10, 11, a plurality of traction assembly tensioners 1012 may be positioned about attachment cables 302, 304, for example at intersections between a traction cable 316 and an attachment cable 302 or 304.

Figure 13:
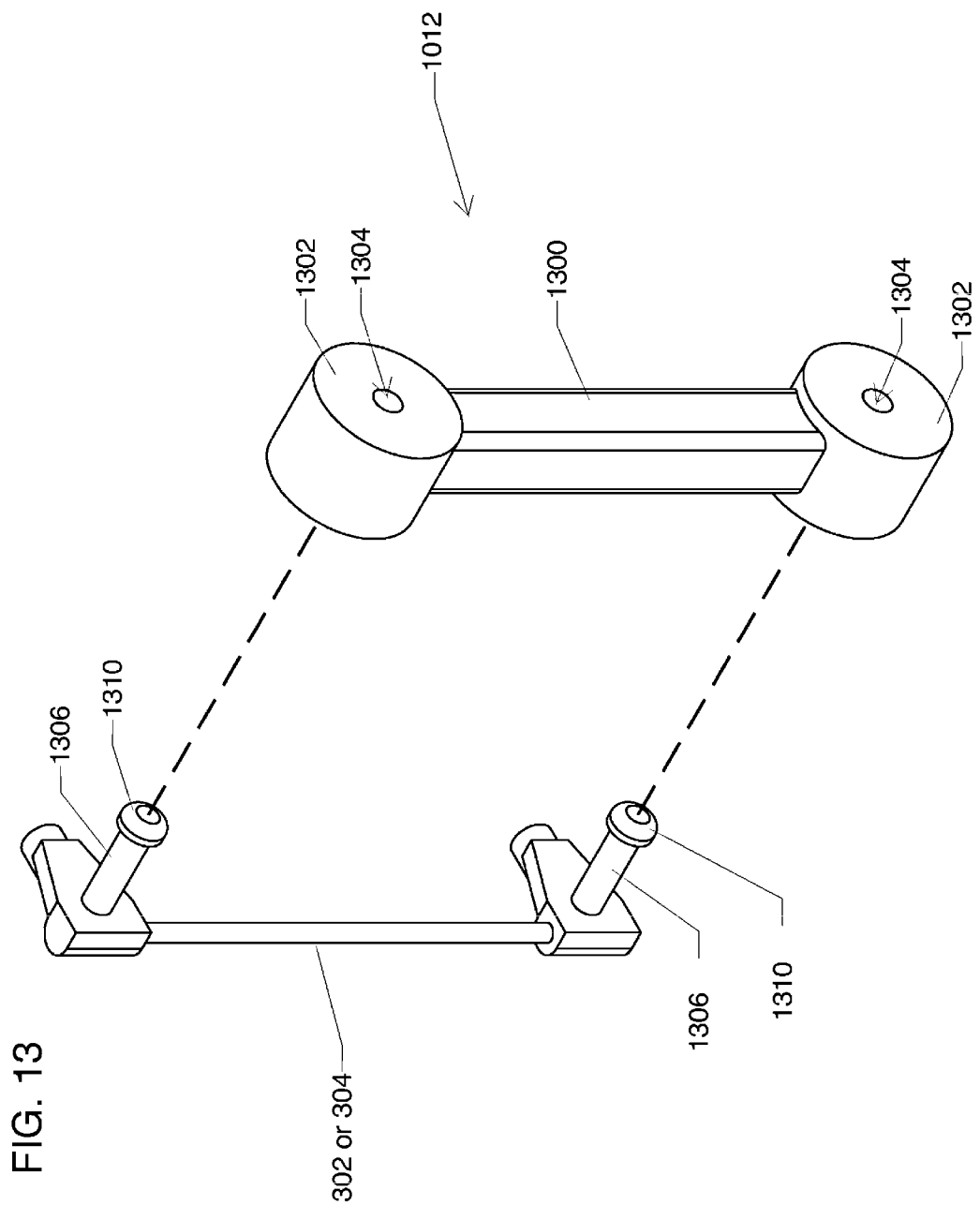
FIG. 13 is a perspective, exploded view, depicting means for attaching an elastomeric tensioner to a traction device.

Referring to FIG. 13, an exploded view of one embodiment of an elastomeric tensioner is shown, depicting means for attaching the tensioner to the traction device. As shown in FIG. 13, one embodiment of a traction assembly tensioner 1012 comprises a midsection 1300, and end sections 1302. End sections 1302 are configured with bores 1304, which are dimensioned to slidably seat around posts 1306, of which a plurality may be positioned about the traction assembly. In some embodiments, posts 1306 are fixedly attached to ferrules 1000, the ferrules being securely attached to the traction assembly, for example, at intersections between a traction cable 316 and an attachment cable 302 or 304. As shown, posts 1306 may be configured with a flange 1310 positioned at the distal aspect of the posts. The flanges 1310 are configured with an outer diameter sufficiently larger than the diameter of the bores 1304, such that flange may slide through a bore 1304 with a degree of resistance, so as to slidably seat end section 1302 over post 1306. When end section 1302 is slidably seated over post 1306, flange 1310 serves to resist unintended disengagement of the end section from the post. Elastomeric tensioners may be constructed from any material that allows a degree of expansion sufficient to allow bores 1304 to accommodate the diameter of flange 1310.

Although FIG. 13 depicts a traction assembly tensioner, those skilled in the art will appreciate that bracket tensioners 1010 may similarly be securely attached to a traction device using the post and bore configuration depicted in FIG. 13. Alternatively, elastomeric tensioners may be secured using bolts, rivets, or the like. Those skilled in the art will further appreciate that the tensioners described herein represent an optional alternative embodiment, and that traction devices which omit these features are nevertheless within the scope of the present disclosure.

Referring to FIG. 14, another embodiment of an attachment assembly portion of a traction device is shown in accordance with the present disclosure. As shown in FIG. 14, a traction assembly 100 may be constructed where the flexible members are formed from links of chain. Those skilled in the art will appreciate that the decision of whether to construct a traction assembly from cables vs. chains is a design choice which depends primarily on the intended use and durability of the traction device. For example, chains are generally used for "heavy duty" uses, such as for traction devices intended for use with large trucks, heavy industrial or agricultural equipment, tractors, transportation vehicles and trailers, and other large vehicles, or where substantial wear and tear may be expected. Conversely, cables are generally used for "light duty" uses, such as for small passenger cars, motorcycles, etc., or where wear and tear is expected to be light. For "medium duty" uses, either cables or chains may be used, or alternatively, some embodiments may comprise a combination of cables and chains. While the artisan will appreciate these generalities, it is understood that the flexible members of the traction assembly 100 may be formed of cables, chains, and/or a combination thereof may be used for any vehicle in accordance with the present disclosure.

Referring to FIG. 15, a perspective view of an attachment mechanism 110 is shown depicting another mode of engagement of the two brackets 106 and 108, similar in operation as the attachment assembly 104 of FIG. 4 in that an adjustable engagement is achieved between mating components of an attachment mechanism 110 which removably engage.

As depicted the attachment assembly 104 as in other modes herein includes brackets 106, 108, which are substantially rigid and are generally U-shaped. The brackets 106, 108 may each include a tread plate 400 configured to contact the ground/road on one side and the rolling surface of a tire on the other side, and side surfaces 402, configured such that the brackets 106, 108 wrap across the rolling surface and at least partially around opposite sidewalls of a tire, thereby substantially straddling the sidewalls of the tire. The brackets 106, 108 may be constructed from a hardened steel alloy or other suitable material that has sufficient strength to resist forces and sufficient hardness to resist friction or wearing from the driving surface.

As also shown, attachment cables 302, 304 are attached to brackets 106, 108, preferably with a pivoting engagement where cable connectors 303 at the distal ends of attachment cables 302 and 304, are in a pivoting connection with the brackets 106 and 108 such as by engagement of the cable connectors 303 through an aperture 403 formed through the side surfaces 402 of the brackets. Other pivoting engagements of the attachment cables 302 and 304 to the brackets 106 and 108 my be employed such as those shown in FIG. 4, or other such pivoting connections which will stand the force imparted during use.

The attachment mechanism 110 as shown in FIG. 15 and FIG. 16, employs an attachment mechanism 110 with engageable connectors or halves of the attachment mechanism 110 are attached to opposite brackets 106, 108. As shown in FIGS. 15-16 the attachment mechanism 110 is positioned about the outward facing side surface of the tire 102 shown in FIG. 10, and configured such that a user may mount the traction assembly 100 around and to the tire without having to reach around to the inward facing side of the tire.

The attachment mechanism 110 in FIGS. 15-16 is formed of two halves where one half of the attachment mechanism 110 is engaged to one bracket 106 and the other half of the attachment mechanism is engaged to the other bracket 108, and the two halves are removably engageable with each other and are slidably adjustable to a fixable engagement which allow the engagement ends of the two halves, which are engaged with the respective brackets 106 and 108, to be adjusted toward and away from each other and then fixed in position by the engagements to the two halves of the attachment mechanism 110. As shown in FIGS. 15-16, this adjustable sliding fixable engagement is provided by a pin 111 on a first half of the attachment mechanism 110 which is positionable into any of a plurality of sequentially positioned apertures 113 formed into a second half of the attachment mechanism 110. Such adjustment allows for the traction assembly 100 to be installed on a tire and the two brackets 106 to be held in fixed positions and in a fixed spacing from each other by the attachment mechanism 110 and the fixed spacing may be adjusted as needed to maintain the cables 302 and 304 of the traction assembly 100 taught.

The same configuration of the attachment mechanism 110 is shown in FIG. 16, however as shown, the flexible members are provided by chains forming a first flexible member or inner attachment cable 302 and second flexible member or outer attachment cable 304. Chains forming the flexible members of the attachment cables 302 and 304 may be employed where the traction assembly 100 is anticipated to encounter heavy duty use or on larger vehicles such as SUV's and trucks.

Installation and Removal Process

The present disclosure is intended to provide easy, one-stop mounting of the tire traction assembly 100 disclosed herein. To mount a traction device upon a tire in accordance 10 with the present disclosure, the user would drape the tire traction assembly 100 over the tire 102. Then the user would feed the first half of the attachment mechanism 110 into engagement with the second half of the attachment mechanism 110 which is then adjusted to hold the two brackets 106 and 108 engaged therewith in a fixed spacing from each other. The attachment mechanism 110, for example, when formed as a tooth and ratchet which are slidably adjustable to a fixable engagement between the two. Such is accomplished by sliding the toothed member 600 into the ratchet mechanism 604 and then actuating the ratchet mechanism by successively pulling the ratcheting lever 610, thereby drawing toothed member 600 into sleeve 606. As toothed member 600 draws further into sleeve 606, brackets 106, 108 are drawn closer together, which, in turn reduces the effective circumference of attachment cables 302, 304, thereby securing the traction assembly around the tire. The engagement of the attachment mechanism 110 is substantially the same where a pin 113 is engaged to a first half of the attachment mechanism 110 which engages any of a plurality of sequentially positioned apertures 113 in the second half of the attachment mechanism 110. Pushing the bracket 108 toward the other bracket 106 while placing the first and second halves of the attachment mechanism in engagement will tighten the flexible members forming the attachment cables 302 and 304, and until the flexible members are taught whereupon the pin 113 is engaged to an aligned aperture 113 and the brackets 106 and 108 are held in a fixed spacing by the attachment mechanism 110 which may be readjusted later if necessary.

To uninstall a traction device in accordance with the present disclosure, the user would generally drive the vehicle to a position where brackets 106, 108 are positioned at any location about the rotation of the tire other than directly pinched between the tire and the ground/road. The user would then release locking lever 614 and slide toothed member 600 out of the ratchet mechanism 604. The user would then slide brackets 106, 108 off of the tire 102, and then drape the attachment assembly 104 to the side of the tire, setting the assembly mechanism on the ground/road. Finally, the user would drive the vehicle forward a sufficient distance to free the portion of the traction device that was located beneath the tire during removal, causing the vehicle tires to drive over a portion of the traction assembly 100, and not a portion of the attachment assembly 104 is comprised of two removably engageable mating attachment components which will adjustably engage, so as to allow the positioning of the two brackets 106 and 108 fixed in distance from each other when positioned operatively on the tire.

Other Embodiments

A number of embodiments have been described herein. Nevertheless, it will be understood that other aspects and embodiments will be apparent to those skilled in the art, and accordingly, that various modifications may be made without departing from the spirit and scope of the present disclosure. For example, the dimensions of the device could be varied to allow for the device to be used on various tire sizes.

As a further example, an alternate embodiment of brackets 106, 108 may feature stamped, recessed areas on the side surfaces 402 designed to reduce wear on the sidewalls of a tire which may be caused by connection points, 502, 504 or pins 804, 904. Such stamped, recessed areas may be configured to provide a substantially aligned plane among the contact points between the two removably engaged fastening components forming the attachment assembly 104 and the sidewalls of a tire. Such recessed areas could be created by use of a stamp-form manufacturing process. In addition, stamped, recessed areas could be configured to increase the strength of the brackets.

Further, the attachment mechanism was described as a ratchet-style mechanism, alternate embodiments could feature other mating elements or attachment methods and mechanisms, provided that the requirement of securely attaching the traction device to the tire is accomplished. Other mating elements or attachment mechanisms in accordance with the present disclosure include bolts, clasps, hooks, tension levers, draw latches, turnbuckles, and the like.

While various aspects and embodiments have been disclosed herein, other aspects and embodiments will be apparent to those skilled in the art. The various aspects and embodiments disclosed herein are for purposes of illustration and are not intended to be limiting. Accordingly, it is intended that other embodiments are within the scope of the following claims and their equivalents:

What is claimed is:

1. A tire engageable traction device comprising:
a tire traction assembly configured to be mounted on a tire, two brackets which are attached to ends of the tire traction assembly,
said tire traction assembly comprising a plurality of flexible members;
a first half of an attachment mechanism in a first connection at one end, to a first of said two brackets;
a second half of said attachment mechanism in a second connection to a second of said two brackets;
opposing ends of each of said plurality of flexible members being in a respective engagement to one of said first bracket or said second bracket; and said first half of said attachment mechanism configured to receive said second half of said attachment mechanism in a removable engagement and thereby hold said first of said two brackets a fixed distance from said second of said two brackets and thereby releasably secure the tire traction assembly around the tire.

2. The device of claim 1 wherein a plurality of flexible members of said tire traction assembly comprise an inner flexible member and an outer flexible member and a plurality of traction members extending to connected therebetween.

3. The device of claim 1, wherein the brackets additionally comprise a planar tread plate engaged on opposite ends with a pair of opposing planar side surfaces forming said brackets in substantially a U-shape; and said respective engagement of said opposing ends of each of said plurality of flexible members being a respective pivoting engagement to a respective said planar side surface of one of said first bracket or said second bracket.

4. The device of claim 2, wherein the brackets additionally comprise a planar tread plate engaged on opposite ends with a pair of opposing planar side surfaces forming said brackets in substantially a U-shape; and said respective engagement of said opposing ends of each of said plurality of flexible members being a respective pivoting engagement to a respective said planar side surface of one of said first bracket or said second bracket.

5. The device of claim 1, wherein said removable engagement of said first half of said attachment mechanism to said second half of said attachment mechanism comprises:

said first half and second half of the attachment mechanism being slidably adjustable to a fixable engagement with said second half of the attachment mechanism to thereby allow provide adjustment of said fixed distance of said first of said two brackets from said second of said two brackets.

6. The device of claim 2, wherein said removable engagement of said first half of said attachment mechanism to said second half of said attachment mechanism comprises:

said first half and second half of the attachment mechanism being slidably adjustable to a fixable engagement with said second half of the attachment mechanism to thereby allow provide adjustment of said fixed distance of said first of said two brackets from said second of said two brackets.

7. The device of claim 3, wherein said removable engagement of said first half of said attachment mechanism to said second half of said attachment mechanism comprises:

said first half and second half of the attachment mechanism being slidably adjustable to a fixable engagement with said second half of the attachment mechanism to thereby allow provide adjustment of said fixed distance of said first of said two brackets from said second of said two brackets.

8. The device of claim 4, wherein said removable engagement of said first half of said attachment mechanism to said second half of said attachment mechanism comprises:

said first half and second half of the attachment mechanism being slidably adjustable to a fixable engagement with said second half of the attachment mechanism to thereby allow provide adjustment of said fixed distance of said first of said two brackets from said second of said two brackets.

9. The device of claim 5, wherein said attachment mechanism comprises:

said first half of said attachment mechanism having a ratcheting mechanism;

said second half of said attachment mechanism being a saw toothed member; and said saw toothed member being slidably adjustable with said ratcheting mechanism.

10. The device of claim 6, wherein said attachment mechanism comprises:

said first half of said attachment mechanism having a ratcheting mechanism;

said second half of said attachment mechanism being a saw toothed member; and said saw toothed member being slidably adjustable with said ratcheting mechanism.

11. The device of claim 7, wherein said attachment mechanism comprises:

said first half of said attachment mechanism having a ratcheting mechanism;

said second half of said attachment mechanism being a saw toothed member; and said saw toothed member being slidably adjustable with said ratcheting mechanism.

12. The device of claim 8, wherein said attachment mechanism comprises:

said first half of said attachment mechanism having a ratcheting mechanism;

said second half of said attachment mechanism being a saw toothed member; and said saw toothed member being slidably adjustable with said ratcheting mechanism.

13. The device of claim 5, wherein said attachment mechanism comprises:

a pin positioned on said first half of the attachment mechanism;

said pin engageable with any of a plurality of sequentially positioned apertures on said second half of said attachment mechanism.

14. The device of claim 6, wherein said attachment mechanism comprises:

a pin positioned on said first half of the attachment mechanism;

said pin engageable with any of a plurality of sequentially positioned apertures on said second half of said attachment mechanism.

15. The device of claim 7, wherein said attachment mechanism comprises:

a pin positioned on said first half of the attachment mechanism;

said pin engageable with any of a plurality of sequentially positioned apertures on said second half of said attachment mechanism.

16. The device of claim 8, wherein said attachment mechanism comprises:

a pin positioned on said first half of the attachment mechanism;

said pin engageable with any of a plurality of sequentially positioned apertures on said second half of said attachment mechanism.

* * * * *